(12) United States Patent
Kawolics et al.

(10) Patent No.: US 6,454,243 B2
(45) Date of Patent: Sep. 24, 2002

(54) SPRINGLESS SEAT CUP

(75) Inventors: Raymond P. Kawolics, Solon; Jeffery J. Labinski, Lakewood, both of OH (US)

(73) Assignee: The Meyer Company, Cleveland, OH (US)

( * ) Notice: Subject to any disclaimer, the term of this patent is extended or adjusted under 35 U.S.C. 154(b) by 25 days.

(21) Appl. No.: 09/781,760

(22) Filed: Feb. 12, 2001

Related U.S. Application Data

(60) Provisional application No. 60/182,359, filed on Feb. 14, 2000.

(51) Int. Cl.[7] ............................................. F16K 31/44
(52) U.S. Cl. ...................................... 251/262; 251/358
(58) Field of Search ................................ 351/262, 231, 351/235, 233, 251, 175, 99, 104, 109, 358; 222/518, 400.7, 400.8

(56) References Cited

U.S. PATENT DOCUMENTS

| | | | |
|---|---|---|---|
| 15,459 A | 7/1856 | Goodridge | |
| 15,719 A | 9/1856 | Goodridge | |
| 92,236 A | 7/1869 | Weaver et al. | |
| 957,347 A | 5/1910 | Kennedy | |
| 2,755,816 A | * 7/1956 | Seltsam | ........................ 137/496 |
| 2,840,339 A | 6/1958 | Price | |
| 3,081,063 A | 3/1963 | Seltsam | |
| 3,094,145 A | 6/1963 | Chernak et al. | |
| 3,104,089 A | 9/1963 | Seltsam | |
| 3,107,894 A | 10/1963 | Quinn | |
| 3,207,472 A | * 9/1965 | Seltsam | ........................ 251/263 |
| 3,246,872 A | 4/1966 | Seltsam | |
| 3,301,525 A | 1/1967 | Chernak et al. | |
| 3,417,962 A | 12/1968 | Fuerst | |
| 3,445,086 A | 5/1969 | Quinn | |
| 3,502,300 A | 3/1970 | Harris et al. | |
| 3,540,636 A | * 11/1970 | Devoracek | ........................ 222/501 |
| 3,584,834 A | 6/1971 | Reid et al. | |
| 3,604,586 A | * 9/1971 | Baldauf et al. | ............... 141/113 |
| 3,822,970 A | * 7/1974 | Smith et al. | ................. 417/552 |
| 3,880,330 A | * 4/1975 | Leas et al. | ..................... 222/136 |

(List continued on next page.)

*Primary Examiner*—Lesley D. Morris
*Assistant Examiner*—David A Bonderer
(74) *Attorney, Agent, or Firm*—Fay, Sharpe, Fagan, Minnich & McKee, LLP

(57) ABSTRACT

A seat cup seal for a valve includes a base portion and a nipple portion projecting outwardly from the base portion. The nipple portion and said base portion define a blind bore about a longitudinal axis that opens in the base portion. The nipple portion defines a transverse end wall at an outermost end relative to the base that is adapted for sealingly engaging an associated valve seat. A flexible shoulder portion interconnects the base portion and the nipple portion so that said nipple portion is selectively movable between a first, relaxed position where the transverse end wall is spaced a first distance from the base and a second, retracted position where the transverse end wall is spaced a second distance from the base, with the second distance being less than the first distance. A plurality of biasing ribs projects outwardly from and extending between the base portion and the nipple portion. The biasing ribs, which are conformed in one of several suitable arrangements, bias or urge the nipple portion toward the first position when it is in its second position. In this manner, the seat cup does not require a coil spring or other separate biasing agent to urge the transverse end wall into sealing engagement with the associated valve seat.

20 Claims, 4 Drawing Sheets

U.S. PATENT DOCUMENTS

| | | | | |
|---|---|---|---|---|
| 3,899,100 A | * | 8/1975 | Rigaud | 138/89 |
| 3,904,174 A | | 9/1975 | Giese | |
| 4,032,106 A | | 6/1977 | Schieser et al. | |
| 4,044,998 A | * | 8/1977 | Giese | 251/331 |
| 4,121,619 A | * | 10/1978 | Pauliukonis | 137/469 |
| 4,166,606 A | * | 9/1979 | Kawolics et al. | 251/214 |
| 4,570,826 A | * | 2/1986 | Fattori | 222/511 |
| 4,589,577 A | * | 5/1986 | Welsh et al. | 222/518 |
| 4,621,750 A | * | 11/1986 | Roethel | 222/505 |
| 4,655,248 A | * | 4/1987 | Chalaire | 137/515.7 |
| 4,693,400 A | * | 9/1987 | Frahm et al. | 222/153.14 |
| 4,703,775 A | * | 11/1987 | Pastrone | 137/625.3 |
| 4,883,254 A | | 11/1989 | Whiteside | |
| 5,044,604 A | * | 9/1991 | Topham et al. | 251/120 |
| 5,109,763 A | * | 5/1992 | Morris et al. | 100/125 |
| 5,183,075 A | * | 2/1993 | Stein | 137/493.6 |
| 5,449,144 A | | 9/1995 | Kowalics | |

* cited by examiner

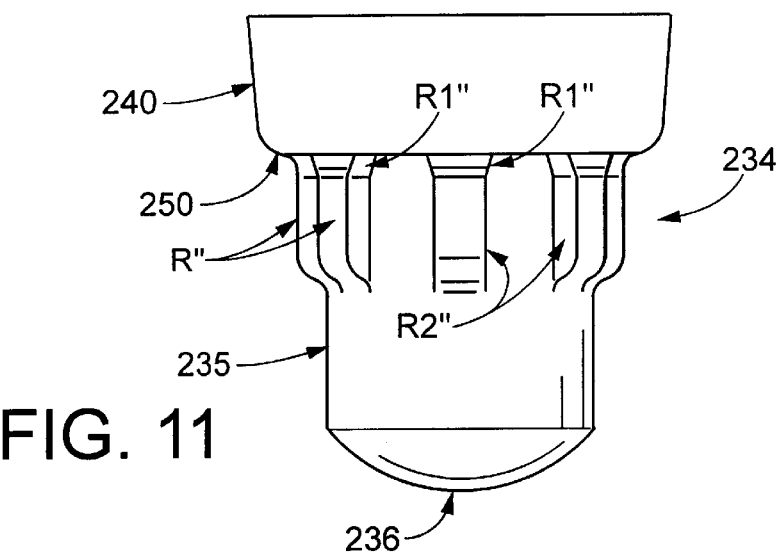
FIG. 11
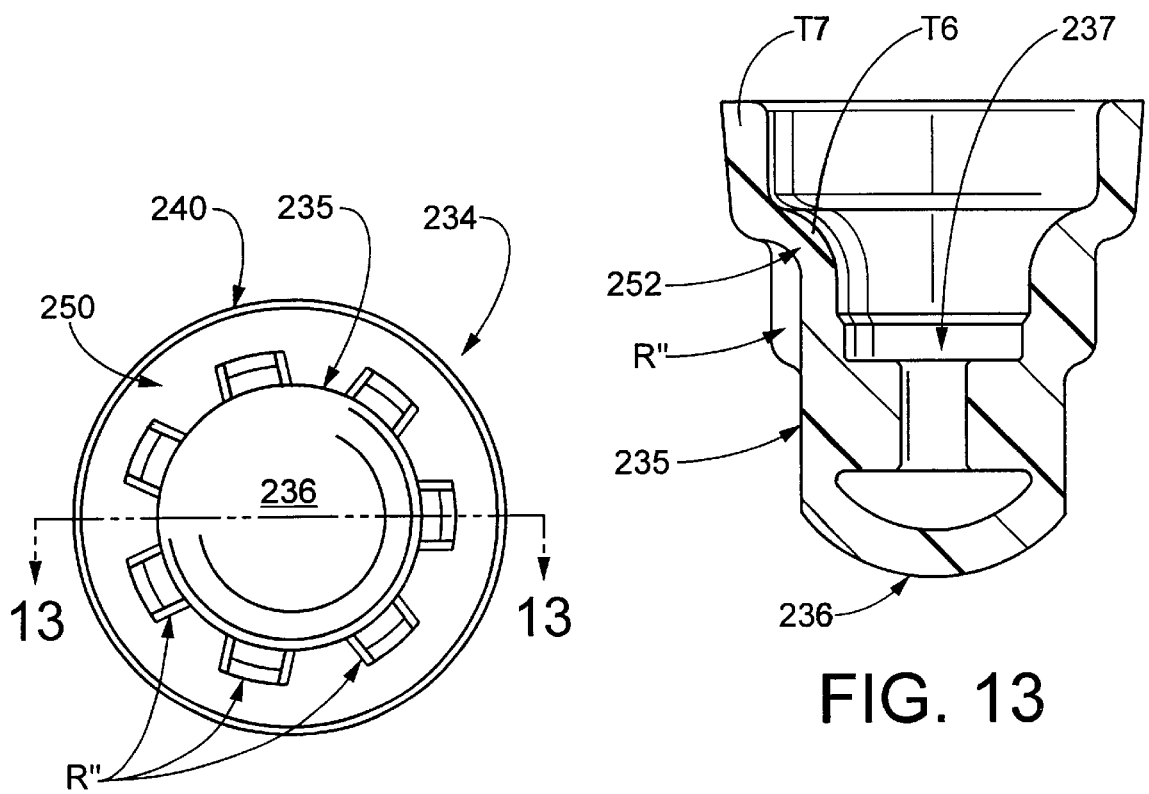
FIG. 12
FIG. 13

SPRINGLESS SEAT CUP

CROSS-REFERENCE TO RELATED APPLICATION

This application claims priority from U.S. provisional application No. 60/182,359 filed Feb. 14, 2000.

BACKGROUND OF THE INVENTION

This invention relates to a novel valve in general and more specifically to a valve construction embodying a novel seal or sealing means. The particular valve assembly here involved and the novel seal which forms a part of the valve assembly are particularly well suited for use in the liquid food dispensing industry but are by no means restricted to such application.

For ease of description, the seal will be referred to hereinafter as a "seat cup." Seat cups, in general, are widely known and derive their name from the fact that they act against a valve seat and have an overall cup-like configuration. Seat cups are generally fabricated from silicone or a like elastomeric resilient material and include a cylindrical base portion and a co-axial nipple portion extending from the base portion and connected thereto by a shoulder. The nipple portion is reduced in cross-sectional dimension with respect to the base portion and is generally cylindrical or frusto-conical converging away from the base. This assembly forms an upwardly opening chamber or recess resembling a cup. The nipple portion terminates in a surface transverse to the longitudinal axis of the seat cup, thereby providing a free or distal end which, as will become apparent hereinafter, provides a portion which is adapted to cooperate sealingly with a valve seat.

When a seat cup of this prior design is operatively placed in the seal chamber of a valve, the base portion is held against axial and lateral displacement relative to the valve body in a position aligned with, but removable from, the valve seat. The nipple portion extends from the base portion toward the valve seat and its free end engages the seat in a fluid-tight sealing relationship to control fluid flow through the valve. A suitable means is employed to mount the nipple removably to the inner end of a reciprocal valve stem which is also aligned with the valve seat. The valve stem projects outwardly from the seat cup recess and an opposite, free end of the stem is connected to an actuator. Upon use of the actuator to move the stem away from the seat, the nipple portion of the seat cup is also partially retracted relative to the seat. Due to flexure at the shoulder, the nipple portion telescopes within the base portion when retracted. Such retraction results in breaking the seal at the valve seat, thereby permitting fluid flow through the valve.

Heretofore, the seat cup has been biased into sealing engagement with the seat through use of a separate spring. In prior devices, a coil spring is coaxially positioned about the stem and a first end of the spring is engaged with a flange on the inner end of the stem while a second end of the spring is engaged with a fixed portion of the valve. The spring ensures that the nipple portion of the seat cup is maintained in tight sealing relation with the valve seat. While this arrangement has proven to be effective, use of a spring adds considerable cost and some complexity to the valve. Therefore, in light of the foregoing, it has been deemed desirable to develop a "springless" seat cup which includes means integral therewith for positively biasing the seat cup into engagement with the valve seat after being retracted away from same, even after many cycles of use.

SUMMARY OF THE INVENTION

In accordance with the present invention, a seat cup seal for a valve includes a base portion and a nipple portion projecting outwardly from the base portion. The nipple portion and said base portion define a blind bore about a longitudinal axis that opens in the base portion. The nipple portion defines a transverse end wall at an outermost end relative to the base that is adapted for sealingly engaging an associated valve seat. A flexible shoulder portion interconnects the base portion and the nipple portion so that said nipple portion is selectively movable between a first, relaxed position where the transverse end wall is spaced a first distance from the base and a second, retracted position where the transverse end wall is spaced a second distance from the base, with the second distance being less than the first distance. A plurality of biasing ribs projects outwardly from and extending between the base portion and the nipple portion. The biasing ribs, which are conformed in one of several suitable arrangements, bias or urge the nipple portion toward the first position when it is in its second position. In this manner, the seat cup does not require a coil spring or other separate biasing agent to urge the transverse end wall into sealing engagement with the associated valve seat.

One advantage of the present invention is that it provides a new and improved seat cup for a valve which does not require use of a separate spring for biasing the seat cup into engagement with a sealing seat of the valve.

Another advantage of the present invention resides in the provision of a springless seat cup which includes smoothly transitioned regions between interconnected portions and controlled wall thicknesses so that it resists breakage even after many thousands of cycles.

A further advantage of the present invention is found in the provision of a springless seat cup for a valve which greatly simplifies assembly of the valve and reduces the cost of same.

Still other benefits and advantages of the present invention will become apparent to those of ordinary skill in the art to which the invention pertains upon reading and understanding the following specification.

BRIEF DESCRIPTION OF THE DRAWINGS

The invention may take physical form in certain parts and arrangements of parts, preferred embodiments of which are described in detail herein and illustrated in the accompanying drawings which form a part hereof and wherein:

FIG. 11 is a side elevational view of still another alternative springless seat cup formed in accordance with the present invention;

FIG. 12 is a bottom plan view of the springless seat cup shown in

FIG. 11; and,

FIG. 13 is a cross-sectional view taken along line 13—13 of FIG. 11.

DETAILED DESCRIPTION OF THE INVENTION

Figure 1:
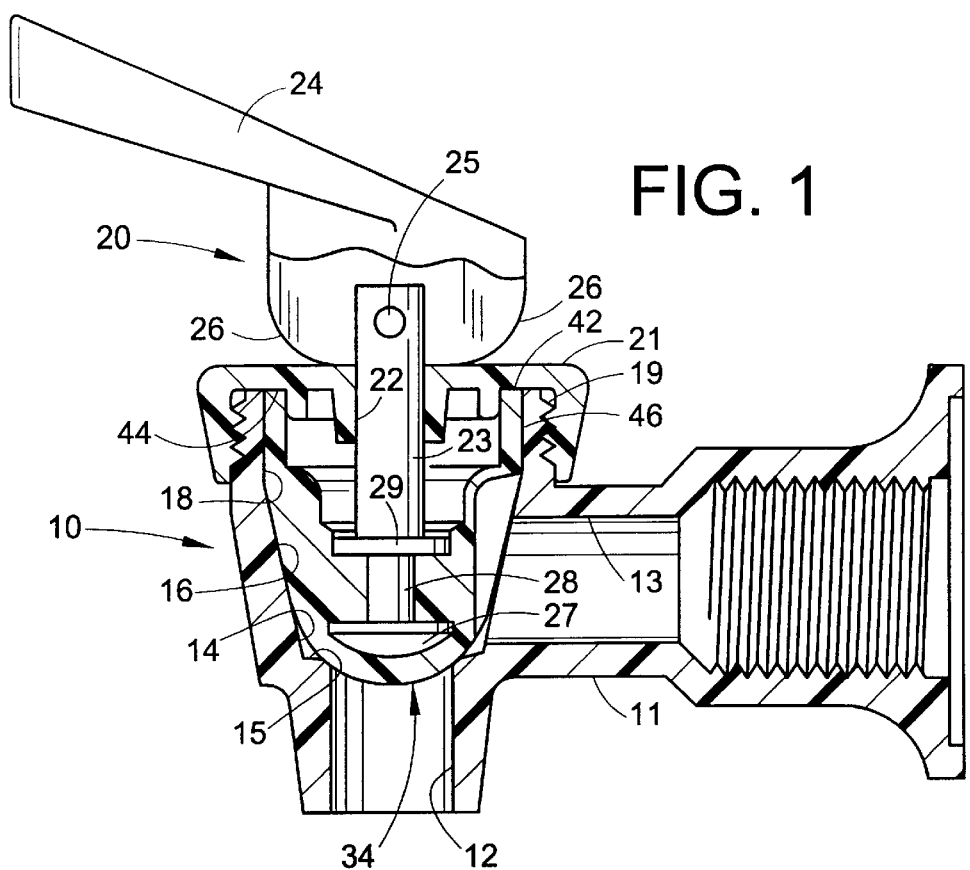
FIG. 1 is a side view, partially in cross-section and partially in elevation, of a springless seat cup formed in accordance with the present invention as operatively positioned in an associated valve assembly to block the flow of liquid therethrough.

Referring to FIG. 1, a valve assembly is illustrated and indicated generally at 10. The valve assembly 10 comprises a body 11 having a fluid outlet 12 and a fluid inlet 13. A fluid passageway 14 is provided in the valve body 11, the former being in communication with the outlet and inlet 12, 13, respectively.

The passageway 14 comprises a sealing seat 15 oriented transversely of the axis of the outlet 12. The passageway 14 is otherwise defined by a frusto-conical region 16 which merges into an enlarged cylindrical actuator opening 18. The portions 16, 18 together define a seal-receiving chamber C. The actuator opening 18 is threaded on its outer periphery 19 to receive a correspondingly threaded cap assembly 20.

The cap assembly 20 comprises an actuator including a bonnet member 21 having a central opening 22 to receive a stem 23 which is slidable relative to the bonnet member. A handle 24 is pivotally attached to the stem 23 by a pin 25. The handle 24 includes an arcuate cam portion 26 for purposes to be hereinafter described. The stem 23 includes an enlarged knob 27 on its lower extremity which is connected to the remainder of the stem 23 by a reduced-diameter cylindrical portion 28. A radially enlarged flange 29 separates the knob 27 and reduced-diameter portion 28 from the remainder of the stem 23.

With reference now also to FIGS. 3–6, received in the seal chamber C is a seat cup component 34 made from silicone or another suitable elastomeric or resilient material. The seat cup 34 comprises a generally tubular, cylindrical nipple portion 35 with a curved, transverse end wall 36 closing the distal end of the nipple 35. The end wall 36, when the seat cup is operatively received in the chamber C, is adapted to engage the sealing seat 15 in a fluid-type relationship. Of course, the nipple portion 35 may alternatively be conformed to have any other suitable overall shape, e.g., frusto-conical converging toward the end wall 36.

Provided in the end wall 36 of the nipple portion 35 is a blind bore 37 formed generally along the longitudinal axis of the seat cup 34 with the inner end of the bore 37 defined by an enlarged portion 38 which is similar in configuration to the knob 27 on the end of the stem 23. The knob 27 is removably snap-fitted into the enlargement 38 and the reduced-diameter cylindrical stem portion 28 is received in the remainder of the bore 37.

The seat cup 34 further comprises a tubular or otherwise conformed base portion 40 which is coaxial with the nipple portion 35 and radially enlarged relative thereto. Again, the base portion 40 need not necessarily be tubular, and other shapes for same are contemplated within the scope of the present invention. The tubular base portion 40 has a wall thickness T1. An upper edge 42 of the tubular base portion 40 abuts an inner surface 44 of the bonnet member 21, while the cylindrical outer surface 46 of the tubular base portion 40 lies adjacent the enlarged cylindrical portion 18 of the seat cup chamber C.

The nipple portion 35 and the tubular base portion 40 are interconnected by a flexible transverse shoulder portion 50. The shoulder portion 50 comprises a wall thickness T2 which is reduced relative to the wall thickness T1 of the tubular base portion 40. The shoulder portion 50 also defines a fillet region 52 which smoothly blends the nipple portion 35 into the tubular base portion 40. The wall thickness T2 of the shoulder portion 50 also defines an inner curved shoulder surface 54 which generally corresponds to the fillet region 52.

The seat cup 34 further comprises a plurality of biasing ribs R which project radially outwardly therefrom and are preferably uniformly and circumferentially spaced about an outer surface of the nipple portion 35. The ribs R extend axially between the end wall 36 and the tubular base portion 40, preferably parallel to the axis of the bore 37. It has been found most preferable to form the seat cup 34 with a total of at least seven such ribs R, e.g., the seat cup 34 includes eight, although less can be used without departing from the overall scope and intent of the present invention.

Each rib R includes a first end 60 connected to the shoulder 50, a top land surface 62, and a second end 64 connected to the end wall 36. The top land surface 62 at the first end 60 of each rib R curves outwardly, away from the nipple portion 35 and blends into the cylindrical surface 46 of the tubular base portion 40. At this first end 62, each rib has a height H1 (FIG. 6) which, together with the thickness T2 of the shoulder 50, defines a substantial thickness T3 which is greater than the thickness T1 of the base portion 40 and, thus, more resistant to deformation. At the opposite, second end 64 of each rib R, the top land surface 62 curves inwardly toward the nipple portion 35 and blends smoothly into the end wall 36. This, then, ensures that the end wall 36 comprises a smooth and uninterrupted portion for mating in a fluid-tight manner with the seat 15 of the valve body 11. As is apparent in FIG. 1, it has been found most preferable that, when the seat cup, 34 is operatively placed in the chamber C with the end wall 36 engaged with the seat 15, the top land surfaces 62 of the ribs R lie adjacent the frusto-conical region 16 defining the chamber C to ensure proper alignment of the seat cup 34 in the chamber.

With reference again to FIGS. 3–6, the ribs R are separated from each other by circumferentially extending bottom land or valley regions 70 which are preferably arcuate and transition smoothly into the ribs R. The bottom land regions 70 between successive ribs R extend from a first end 72 which connects to and blends smoothly into the shoulder fillet region 52. At an opposite axial end 74, each bottom land region 70 connects with the end wall 36, without interrupting a portion thereof which is adapted to mate with the valve seat 15. Also, each rib R defines a uniform circumferential width or thickness along its axial length.

Operation of the springless seat cup 34 will now be explained with particular reference to FIGS. 1 and 2. In an operative position, the seat cup 34 is received in the chamber C as described above. FIG. 1 illustrates the seat cup 34 in its first or normally closed position wherein the end wall 36 of the nipple portion 35 is sealingly engaged with the valve seat 15. In this first position, the bonnet member 21 exerts a preloading force on the seat cup 34 toward the valve seat 15 as controlled by the threaded connection 19 between the bonnet 21 and the body 11. The preloading force is transmitted to the end wall 36 primarily through the biasing ribs R. This preloading ensures a fluid-tight seal between the wall 36 of the seat cup 34 and valve seat 15 when the seat cup is in this first, normally closed position.

Figure 2:
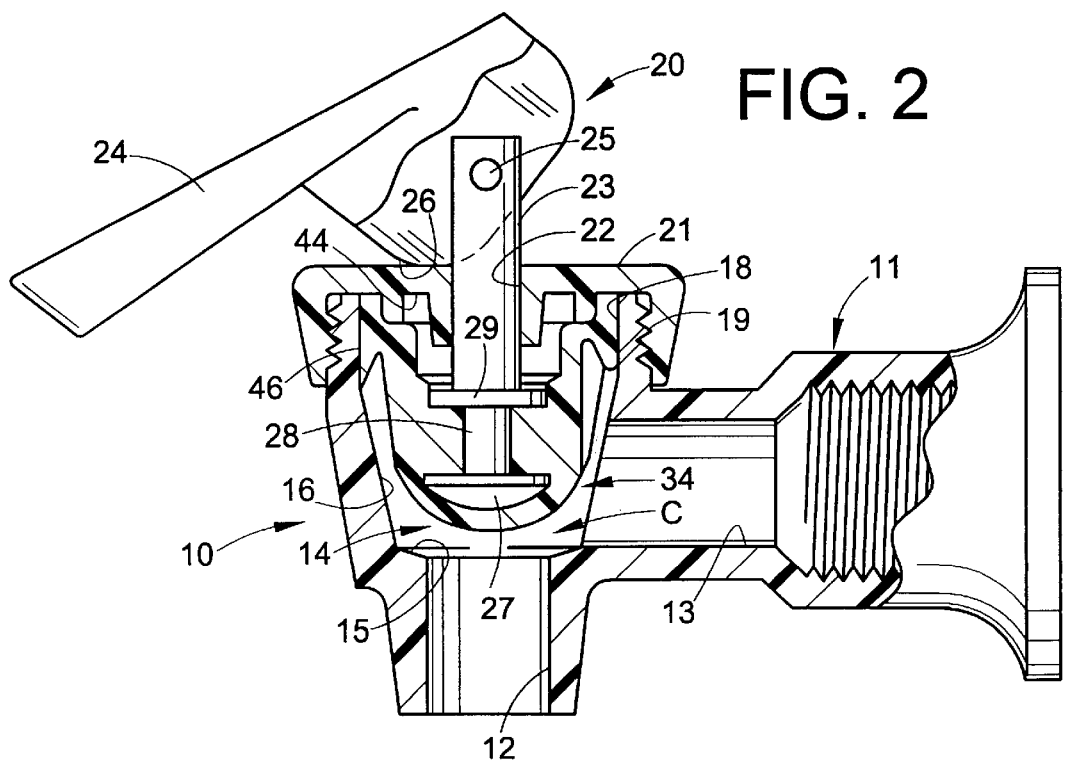
FIG. 2 illustrates the valve assembly and seat cup of FIG 1, with the seat cup shown in its open position to permit liquid flow through the valve assembly.
Figure 3:
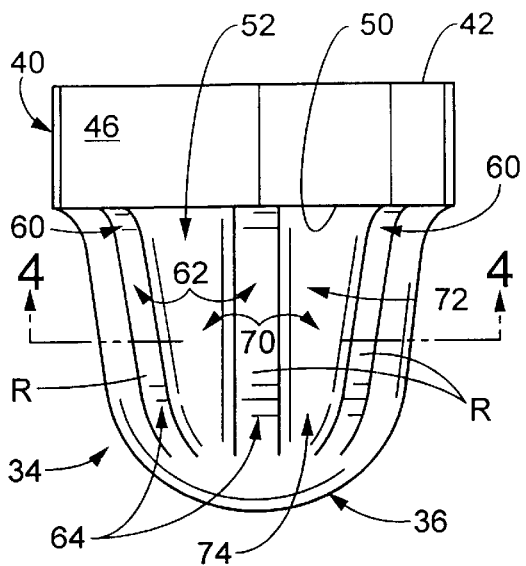
FIG. 3 is a side elevational view of the springless seat cup illustrated in FIG. 1.
Figure 4:
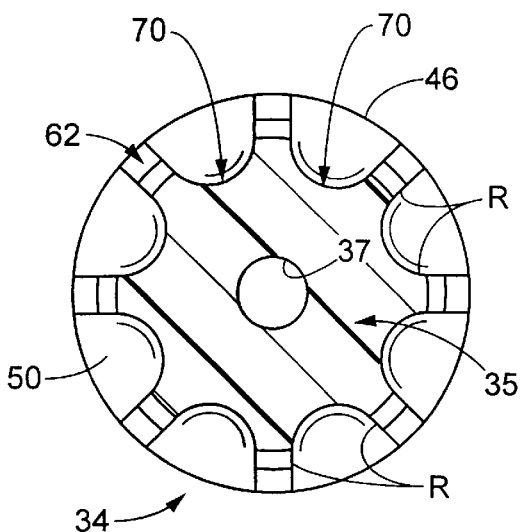
FIG. 4 is a cross-sectional view taken along line 4—4 of FIG. 3.
Figure 5:
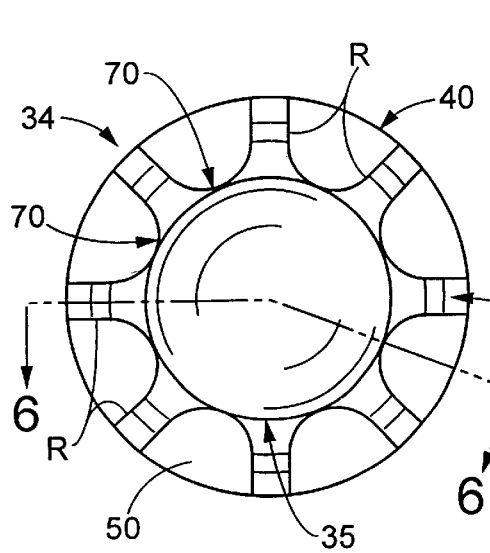
FIG. 5 is a bottom plan view of the seat cup illustrated in FIG. 3.
Figure 6:
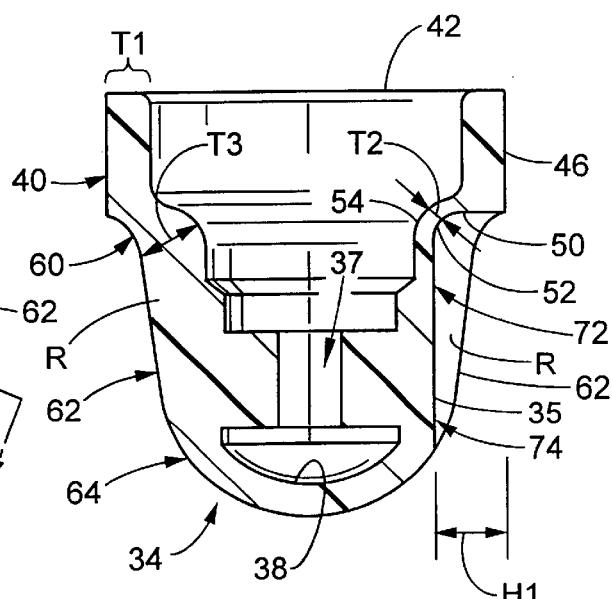
FIG. 6 is a cross-sectional view taken along line 6—6 of FIG. 5.
Figure 7:
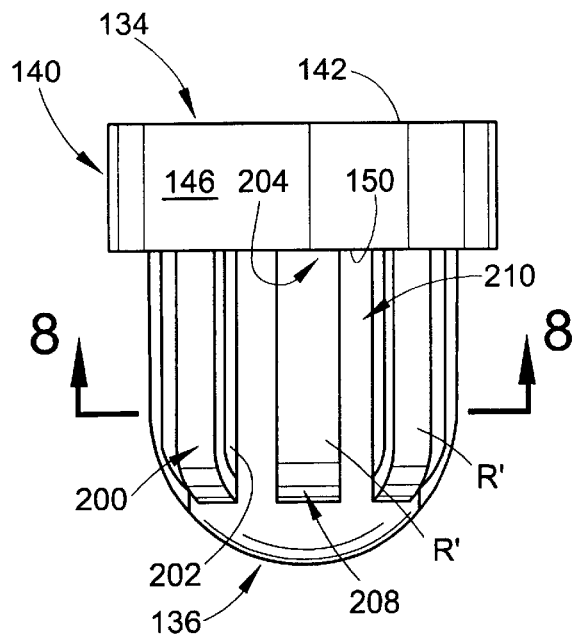
FIG. 7 is a side elevational view of an alternative springless seat cup formed in accordance with the present invention.

With reference now also to FIG. 2, manual rotation of the handle 24 about the pin 25 (in either direction) causes the cam surface 26 thereof to bear against the bonnet member 21 and, consequently, results in the stem 23 being pulled away from the seat 15. Due to the interconnection of the stem 23 and the seat cup 34 in the bore 37 and enlarged portion 38 thereof, the stem 23 exerts a pulling force on the nipple portion 25 of the seat cup 34 in a direction away from the seat 15. The tubular base portion 40 of the seat cup 34 is restrained from movement away from the seat 15 due to the abutment between its upper edge 42 and the bonnet inner surface 44. Also, the wall thickness T1 of the tubular base portion 40 is sufficient so that it resists deformation. The closely surrounding cylindrical portion 18 of the valve body 11 also supports the tubular base portion 40 of the seat cup 34 and prevents; lateral movement thereof.

On the other hand, the relatively reduced wall thickness T2 of the shoulder region 50 promotes flexure of the seat cup 34 in that region so that the nipple portion 35 retracts away from the seat 15 and telescopes partially into the tubular base portion 40 so that the end wall 36 is moved to a second position closer to the base portion 40. Retraction of the nipple portion 35 relative to the tubular portion 40 in this manner also results in deformation of the ribs R at their first ends 60. However, the thickness T3 of the walls of the seat cup 34 at the first end 62 of each rib R provides a biasing force which resists this retraction of the nipple portion 35 relative to the valve seat 15. Accordingly, upon a user of the valve 10 releasing the handle 24, the ribs R bias the nipple portion 35 away from the tubular base portion 40 toward and into fluid-tight engagement with the valve seat 15 without aid of a coil spring or other like separate biasing device.

FIGS. 7–10 illustrate an alternative springless seat cup 134 in accordance with the present invention. Except as shown in FIGS. 7–10 and/or as described herein, the seat cup 134 is otherwise the same as the seat cup 34. Consequently, in FIGS. 7–10, like portions of the seat cup 134 relative to the seat cup 34 are identified with like reference numerals which are 100 greater than the reference numerals used in FIGS. 1–6. New portions of the seat cup 134 are identified with new reference numerals and letters.

The nipple portion 135 of the seat cup 134 is joined to the tubular base portion 140 by way of a transverse shoulder 150. Like the seat cup 34, the shoulder 150 comprises an arcuate fillet region 152 which smoothly transitions and blends the nipple portion 135 into the shoulder 150. The shoulder portion has a wall thickness T4 which is greater than the thickness T2 used in the seat cup 34, but still less than the wall thickness T1 of the tubular base portion 140 to promote flexure of the shoulder 150.

The seat cup 134 also comprises a plurality of biasing ribs R' which are similar to the ribs R in that they extend continuously between and connect the shoulder 150 and the end wall 136. However, as is evident from FIG. 8, the ribs R' have a T-shaped cross-section owing to the fact that they have a smaller circumferential width adjacent the nipple portion 135 and a larger circumferential width at the top land surface 200 spaced radially from the nipple portion 135, i.e., the top land surface 200 of each rib R' is wider relative to a base portion 202 of each rib. At a first end 204 of each rib R', the top land surface 200 intersects the shoulder 150 at an angle which is preferably approximately 90°. At an opposite, second end 208 of each of the biasing ribs R', the top land surface 200 curves inwardly toward the nipple portion 135 and blends smoothly into the end wall 136 so as not to interrupt that portion of the wall 136 which is adapted to mate with the seat 15 of an associated valve body 11.

Figure 8:
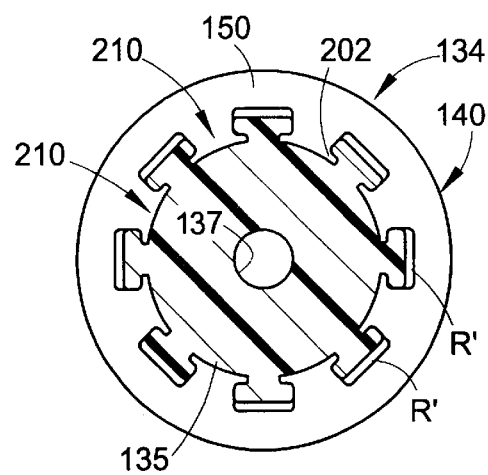
FIG. 8 is a cross-sectional view taken along line 8—8 of FIG. 7.
Figure 9:
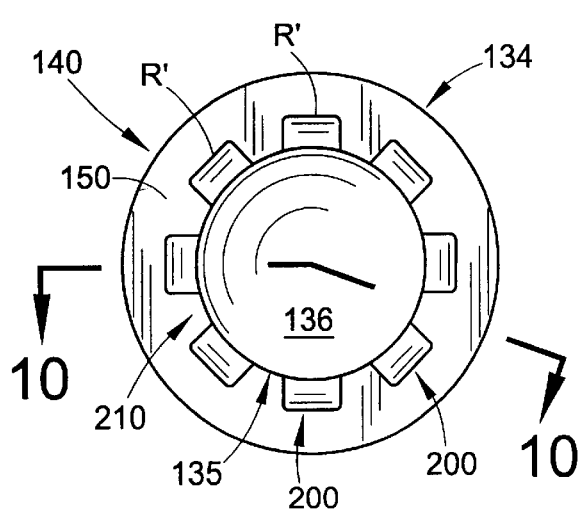
FIG. 9 is a bottom plan view of the seat cup shown in FIG. 7.
Figure 10:
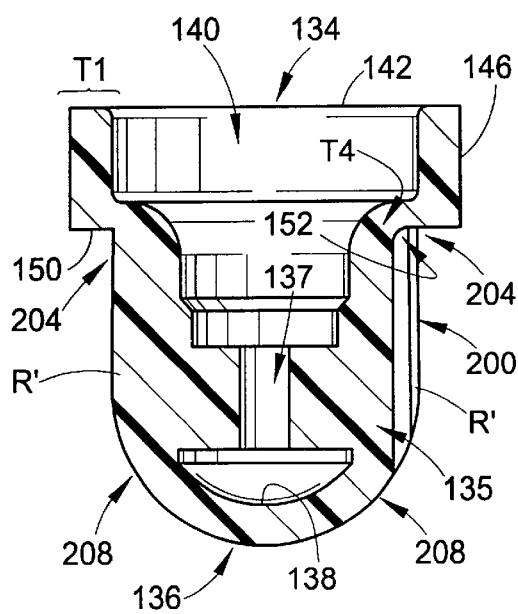
FIG. 10 is a cross-sectional view taken along line 10—10 of FIG. 9.

As is most readily apparent in FIGS. 8 and 9, the valleys or bottom land regions 210 interconnecting or defined between adjacent ribs R' are provided by the nipple portion 135, itself, i.e., the base portion 202 of each T-shaped rib R' is connected to the nipple portion 135 and projects radially outward therefrom.

The springless seat cup 134 functions in the same manner as the springless seat cup 34 in that the ribs R' bias the end wall 136 into engagement with the seat 15 for purposes of blocking fluid flow from the inlet 13 to the outlet 12 of an associated valve body 11. Furthermore, the reduced wall thickness T4 in the shoulder region 150 relative to the wall thickness T1 of the tubular base portion 140 promotes flexure in the shoulder region. Accordingly, the seat cup 134 is selectively movable away from the seat 15 by rotational movement of the handle 24 of an associated valve body 11, but returns to its normally closed position in engagement with the seat 15, upon the handle 24 being released due to the biasing force of the ribs R'.

FIGS. 11–13 illustrate still another alternative springless seat cup 234 in accordance with the present invention. Except as shown in FIGS. 11–13 and/or as described herein, the seat cup 234 is otherwise the same as the seat cup 34. Consequently, in FIGS. 11–13, like portions of the seat cup 234 relative to the seat cup 34 are identified with like reference numerals which are 200 greater than the reference numerals used in FIGS. 1–6. New portions of the seat cup 234 are identified with new reference numerals and letters.

The nipple portion 235 of the seat cup 234 defines a circular, cross-section with a cylindrical outer surface. The base portion 240 is preferably cylindrical or, as shown, slightly tapered toward the nipple portion 235. The nipple portion 235 is joined to the base portion 240 by way of a transverse shoulder 250. Like the seat cup 34, the shoulder 250 comprises an arcuate region 252 which smoothly transitions and blends the nipple portion 235 into the shoulder 250. The shoulder portion 250 has a wall thickness T6 less than the wall thickness T7 of the base portion 240 to promote flexure of the shoulder 250.

The seat cup 234 also comprises a plurality of biasing ribs R" that extend between and connect the shoulder 250 and the nipple portion 235. However, as is evident from FIGS. 11 and 12, the ribs R" have a non-uniform cross-section along their axial length. Specifically, adjacent the shoulder 250, the ribs R" define a first portion R1" that has a larger circumferential width than a second rib portion R2" that is separated from the shoulder by the first portion R1". The first portion R1" tapers moving toward the end wall 236 and blends into the second rib portion R2". The second portion R2", itself, preferably defines a uniform width along its length. Each rib R" terminates approximately halfway between the shoulder 250 and the end wall 236, and the portion of the nipple 235 axially between the ribs R" and the end wall 236 is preferable smooth and purely cylindrical.

Here, again, the springless seat cup 234 functions in the same manner as the springless seat cup 34 in that the ribs R" bias the end wall 236 into engagement with the seat 15 for purposes of blocking fluid flow from the inlet 13 to the outlet 12 of an associated valve body 11. Furthermore, the reduced wall thickness T6 in the shoulder region 250 relative to the wall thickness T7 of the base portion 240 promotes flexure in the shoulder region. Accordingly, the seat cup 234 is selectively movable away from the seat 15 by rotational movement of the handle 24 of an associated valve body 11, but returns to its normally closed position in engagement with the seat 15, upon the handle 24 being released due to the biasing force of the ribs R".

The invention has been described with reference to preferred embodiments. Modifications and alterations may occur to others upon reading the preceding specification. It is intended that the invention be construed as including all such modifications and alterations insofar as they are encompassed by the appended claims as construed literally and/or according to the doctrine of equivalents.

Having thus described the preferred embodiments, what is claimed is:

1. A seat cup seal for a valve, said seat cup comprising:
   a base portion;
   a nipple portion projecting outwardly from said base portion, said nipple portion and said base portion defining a blind bore about a longitudinal axis that opens in said base portion, said nipple portion comprising a transverse end wall at an outermost end relative to said base;
   a flexible shoulder portion interconnecting said base portion and said nipple portion so that said nipple portion is selectively movable between a first, relaxed position where said transverse end wall is spaced a first distance from said base and a second, retracted position where said transverse end wall is spaced a second distance from said base, said second distance less than said first distance; and,
   at least one biasing rib projecting outwardly from and extending between said base portion and said nipple portion, said at least one rib urging said nipple portion toward said first position when said nipple portion is in said second position.

2. The seat cup seal as set forth in claim 1, wherein said at least one biasing rib extends between said base portion and said nipple portion in a direction parallel to said longitudinal axis.

3. The seat cup seal as set forth in claim 1, wherein said nipple portion defines an outer surface and a circular cross-section centered on said longitudinal axis, and wherein said at least one biasing rib comprises a plurality of biasing ribs spaced circumferentially about said outer surface.

4. The seat cup seal as set forth in claim 3, wherein said nipple portion defines one of a cylindrical and a frusto-conical outer surface.

5. The seat cup seal as set forth in claim 3, wherein said plurality of biasing ribs comprises at least seven biasing ribs.

6. The seat cup seal as set forth in claim 3, wherein each of said plurality of biasing ribs blends into said nipple portion at a location axially spaced from said base portion.

7. The seat cup seal as set forth in claim 3, wherein each of said plurality of biasing ribs defines a uniform circumferential width between said base portion and said nipple portion.

8. The seat cup seal as set forth in claim 3, wherein each of said plurality of biasing ribs defines a circumferential width that is greater at a first end adjacent said base portion and lesser at a second end spaced axially from said base portion.

9. The seat cup seal as set forth in claim 3, wherein each of said plurality of ribs defines a first circumferential width adjacent said nipple portion and a second circumferential width spaced radially outwardly from said nipple portion whereby each of said plurality of ribs defines a T-shaped cross-section.

10. The seat cup seal as set forth in claim 3, wherein said base portion defines one of a cylindrical and a frusto-conical outer surface.

11. The seat cup seal as set forth in claim 1, further comprising a stem having a first end anchored in said blind bore and a second end projecting outwardly from said blind bore.

12. The seat cup seal as set forth in claim 1, wherein said at least one biasing rib blends into said nipple portion at a location axially spaced from said base portion.

13. The seat cup seal as set forth in claim 1, wherein said at least one biasing rib projects extends from said base portion toward said outermost end of said nipple portion and terminates intermediate said base portion and transverse end wall at a location axially spaced from said transverse end wall.

14. The seat cup seal as set forth in claim 13, wherein said transverse end wall is curved, and wherein each of said plurality of biasing ribs blends into said transverse end wall.

15. The seat cup seal as set forth in claim 1, wherein said base portion is defined by a wall thickness T1 and said shoulder portion is defined by a wall thickness T2 and wherein T2<T1.

16. The seat cup seal as set forth in claim 1, wherein said base portion, said nipple portion, said shoulder portion and said at least one biasing rib are defined as a one-piece construction from a resilient elastomeric material.

17. The seat cup as set forth in claim 16, wherein said one-piece construction comprises silicone.

18. A seat cup seal comprising:
   an annular base portion;
   a nipple portion projecting axially outwardly from said annular base portion circumferentially coextensively with said base portion, said nipple portion defining one of a cylindrical and a frusto-conical outer surface and a transverse end wall at its outermost end adapted for sealing engagement with an associated valve seat; and,
   a plurality of biasing ribs extending axially between and connected to said base portion and said nipple portion, said plurality of biasing ribs projecting radially outwardly from and circumferentially spaced about said outer surface of said nipple portion and biasing said transverse end wall away from said base portion.

19. A valve assembly comprising:
   a valve body defining a fluid outlet, a fluid inlet and a passageway fluidically interconnecting the outlet and inlet, said passageway defining a seal chamber and a valve seat, said seal chamber adapted for receipt of a seat cup seal and defining an actuator opening intermediate said inlet and outlet;
   a seat cup seal located in said seal chamber, said seat cup seal comprising: (i) a base portion; (ii) a nipple portion projecting outwardly from said base portion and comprising a transverse end wall at an outermost end relative to said base, said transverse end wall movable selectively toward and away from said base portion between a first position in sealing engagement with said valve seat and a second position spaced from said valve seat; and, (iii) at least one biasing rib protecting outwardly from and extending between said base portion and said nipple portion, said at least one rib urging said nipple portion toward said first position when said nipple portion is in said second position;

a stem coupled to said nipple portion of said seat cup seal and protecting outwardly from said base portion through said actuator opening; and, an actuator coupled to said stem whereby movement of said actuators moves said nipple portion to and between said first and second positions.

20. The valve assembly as set forth in claim 19, wherein said stem is coaxial with a longitudinal axis of said seat cup seal, said nipple portion defines a circular cross-section centered on said longitudinal axis and said at least one biasing rib comprises a plurality of biasing ribs spaced uniformly circumferentially about said outer surface.

* * * * *